(12) United States Patent
Maskell

(10) Patent No.: US 11,193,291 B2
(45) Date of Patent: Dec. 7, 2021

(54) SYSTEMS, ASSEMBLIES, AND METHODS OF REDUCING HEAD LOSS IN HEATING DEVICES

(71) Applicant: ZODIAC POOL SYSTEMS LLC, Vista, CA (US)

(72) Inventor: Bruce William Maskell, Vista, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 882 days.

(21) Appl. No.: 15/067,886

(22) Filed: Mar. 11, 2016

(65) Prior Publication Data

US 2016/0194892 A1 Jul. 7, 2016

Related U.S. Application Data

(63) Continuation of application No. 14/027,330, filed on Sep. 16, 2013, now abandoned.
(Continued)

(51) Int. Cl.
*E04H 4/12* (2006.01)
*F16K 15/18* (2006.01)
(Continued)

(52) U.S. Cl.
CPC .......... *E04H 4/129* (2013.01); *E04H 4/1209* (2013.01); *E04H 4/1245* (2013.01); *E04H 4/14* (2013.01); *F16K 11/076* (2013.01); *F16K 15/188* (2013.01); *F28D 1/05325* (2013.01); *F28F 27/02* (2013.01); *F28D 1/0476* (2013.01); *F28D 7/06* (2013.01); *F28D 7/08* (2013.01); *F28D 7/1607* (2013.01); *F28F 2250/06* (2013.01); *Y10T 137/6416* (2015.04); *Y10T 137/86726* (2015.04); *Y10T 137/877* (2015.04); *Y10T 137/87362* (2015.04)

(58) Field of Classification Search
CPC ....... E04H 4/128; E04H 4/1209; E04H 4/129; E04H 4/1245; Y10T 137/6416; Y10T 137/86726; Y10T 137/87362; F16K 15/188; F28F 2250/06
See application file for complete search history.

(56) References Cited

U.S. PATENT DOCUMENTS 803,189 A * 10/1905 Palmer .................... F25B 45/00
137/599.01
2,025,665 A * 12/1935 Dickinson ............... F16K 13/02
251/228

(Continued)

OTHER PUBLICATIONS

U.S. Appl. No. 14/027,330 , Advisory Action, dated May 12, 2015, 3 pages.
(Continued)

*Primary Examiner* — Atif H Chaudry
(74) *Attorney, Agent, or Firm* — Kilpatrick Townsend & Stockton LLP; Dean W. Russell

(57) ABSTRACT

Low head loss systems are detailed. The systems may include chambers having low impedance to water flow therethrough and repositionable gates or other valves within the chambers. The valves may direct water as a function of whether an associated heating device is active. At least some gates may incorporate poppet valves or other high-flow by-passes.

10 Claims, 4 Drawing Sheets

Related U.S. Application Data

(60) Provisional application No. 61/703,397, filed on Sep. 20, 2012.

(51) Int. Cl.

| | |
|---|---|
| *E04H 4/14* | (2006.01) |
| *F16K 11/076* | (2006.01) |
| *F28F 27/02* | (2006.01) |
| *F28D 1/053* | (2006.01) |
| *F28D 1/047* | (2006.01) |
| *F28D 7/08* | (2006.01) |
| *F28D 7/16* | (2006.01) |
| *F28D 7/06* | (2006.01) |

(56) References Cited

U.S. PATENT DOCUMENTS

| | | | | |
|---|---|---|---|---|
| 2,880,818 | A | * | 4/1959 | Dow .................. C10G 5/02 |
| | | | | 95/146 |
| 3,134,366 | A | | 5/1964 | Miller |
| 3,292,598 | A | * | 12/1966 | Miller .................. F24H 1/40 |
| | | | | 122/406.1 |
| 3,399,540 | A | * | 9/1968 | Kahmann ............... E04H 4/129 |
| | | | | 62/201 |
| 3,786,921 | A | | 1/1974 | Johnson |
| 4,086,956 | A | | 5/1978 | Block et al. |
| 4,088,113 | A | * | 5/1978 | McIntire .................. F24H 1/41 |
| | | | | 126/502 |
| 4,138,993 | A | * | 2/1979 | Conley .................. F24J 2/244 |
| | | | | 126/563 |
| 4,238,933 | A | * | 12/1980 | Coombs .............. F24D 11/0235 |
| | | | | 62/238.7 |
| 4,279,128 | A | | 7/1981 | Leniger |
| 4,330,412 | A | | 5/1982 | Frederick |
| 4,398,562 | A | | 8/1983 | Saarem |
| 4,533,114 | A | | 8/1985 | Cory |
| 4,858,681 | A | * | 8/1989 | Sulzberger ............... F17D 5/04 |
| | | | | 165/70 |
| 5,566,881 | A | * | 10/1996 | Inoue .................. B60H 1/00485 |
| | | | | 137/599.14 |
| 6,089,537 | A | * | 7/2000 | Olmsted .................. F16K 3/10 |
| | | | | 251/129.11 |
| 6,695,970 | B2 | | 2/2004 | Hornsby |
| 8,479,771 | B2 | | 7/2013 | Fuentes et al. |
| 9,091,203 | B2 | * | 7/2015 | Geradts |
| 2004/0004034 | A1 | * | 1/2004 | Hornsby ............. F16K 31/0668 |
| | | | | 210/167.12 |
| 2010/0236538 | A1 | * | 9/2010 | Wah ........................ F23N 5/105 |
| | | | | 126/39 BA |
| 2012/0042445 | A1 | | 2/2012 | McQueen et al. |
| 2012/0131941 | A1 | * | 5/2012 | Ackner .................. F24J 2/055 |
| | | | | 62/235.1 |

OTHER PUBLICATIONS

U.S. Appl. No. 14/027,330 , Final Office Action, dated Dec. 14, 2015, 10 pages.
U.S. Appl. No. 14/027,330 , Final Office Action, dated Feb. 12, 2015, 14 pages.
U.S. Appl. No. 14/027,330 , Amendment and Response After Final Office Action, filed Apr. 29, 2015, 12 pages.
U.S. Appl. No. 14/027,330 , Non-Final Office Action, dated May 22, 2015, 10 pages.
U.S. Appl. No. 14/027,330 , Amendment and Response after Non-Final Office Action, filed Sep. 11, 2015, 9 pages.
U.S. Appl. No. 14/027,330 , Non-Final Office Action, dated Aug. 26, 2014, 11 Pages.
U.S. Appl. No. 14/027,330 , Amendment and Response after Non-Final Office Action, filed Nov. 24, 2014, 10 pages.
International Patent Application No. PCT/US2013/059863, International Search Report and Written Opinion, dated Nov. 22, 2013, 13 pages.
International Patent Application No. PCT/US2013/059863, International Preliminary Report on Patentability, dated Apr. 2, 2015, 9 pages.
Australian Patent Application No. 2013318342, Examination Report No. 1, dated Nov. 24, 2016, 3 pages.

* cited by examiner

SYSTEMS, ASSEMBLIES, AND METHODS OF REDUCING HEAD LOSS IN HEATING DEVICES

CROSS-REFERENCE TO RELATED APPLICATIONS

This application is a continuation of U.S. patent application Ser. No. 14/027,330, filed Sep. 16, 2013, which claims the benefit of U.S. Provisional Patent Application Ser. No. 61/703,397, filed Sep. 20, 2012, and entitled "Low Head Loss Device for Swimming Pool Heaters or Other Applicable Equipment," the entire contents of both of which applications are incorporated herein by this reference.

FIELD OF THE INVENTION

This invention relates to flow by-pass systems and assemblies and methods of their use and more particularly, although not necessarily exclusively, to systems and assemblies within manifolds for allowing flowing water to by-pass heat exchangers or other components of swimming pool heaters when such heaters are inactive.

BACKGROUND OF THE INVENTION

U.S. Pat. No. 4,279,128 to Leniger describes an example of a heating system for recirculating water of a swimming pool. The system employs a heat pump to move heat-transfer fluid through primary coils of a heat exchanger while pool water circulates through secondary coils of the heat exchanger. Not all of the circulating pool water passes into the secondary coils, however; instead, some water continues through the circulation system unheated.

The system of the Leniger patent utilizes both a manually-operable diverter valve to divert pool water toward the heat exchanger and a three-way regulator valve further directing only a portion of the diverted water to the heat exchanger. Designed to maintain relatively constant temperature and pressure of the heat transfer fluid at the exit of the heat pump, the system causes the regulator valve to increase or decrease the amount of pool water passed to the heat exchanger as a function of heat transfer fluid temperature. No other technique of causing all water to by-pass the heat exchanger when the heater is inactive is detailed in the Leniger patent, however, nor is any diverter valve positioned in a heater manifold.

U.S. Pat. No. 4,398,562 to Saarem, et al., discloses a sample diverter valve for use with swimming pools. The valve, which is motorized, includes a single inlet and two outlets. Two drive motors are mounted on opposite sides of a drive shaft; as the shaft rotates, a diverter member is turned from a first position (connecting the inlet to one outlet) to a second position (connecting the inlet to the second outlet).

U.S. Pat. No. 6,695,970 to Hornsby details another diverter, or by-pass, valve for recirculating water systems of swimming pools. Included in the valve are both a sliding and a stationary plate, each containing multiple openings. The plates are parallel and abutting; depending on the position of the sliding plate, more or fewer of its openings align with those of the stationary plate to determine water flow through the valve. The entire contents of the Leniger, Saarem, and Hornsby patents are incorporated herein by this reference.

SUMMARY OF THE INVENTION

The present invention provides a low-restriction chamber in a manifold of a heating device. When the heating device is inactive, water may be diverted through the low-restriction chamber for return to a recirculation system (or otherwise) so as to reduce head loss in the flowing water. By redirecting water from an inactive heating device to the low-restriction chamber, less energy may be necessary to circulate the water through the system. Additionally, by avoiding passing water through a heat exchanger when heating is not occurring, less erosion or corrosion of components of the heat exchanger occurs. Positioning the low-restriction chamber and by-pass apparatus within the manifold helps protect them from damage and should result in a less-costly by-pass system, as no separate external plumbing is required.

In some versions of the invention, present in the low-restriction chamber may be a flow gate. The gate, preferably (although not necessarily) made of lightweight material, may move between at least first and second positions. In the first position, the gate allows substantially-unrestricted flow through the chamber from an inlet to an outlet of the manifold. By contrast, in the second position, the gate diverts water through the heat exchanger of the heating device. The first position thus may be called the "open" position, corresponding if desired to situations in which the heating device is inactive. The second position would then be the "closed" position, appropriate when the heating device is active.

Any suitable actuator may cause the gate to move between (at least) the first and second positions. A solenoid, servo-motor, or other automatic device is preferably used as the actuator, although manually-operated devices may be used instead in certain instances. Also incorporated into some embodiments of the gate may be a poppet valve assembly. Such an assembly typically exists separate from any diverter valve and is designed to limit the amount of water flowing through the finned tubes of the heat exchanger. In certain versions of the invention, however, the poppet assembly is combined with the gate within the low-restriction chamber.

It thus is an optional, non-exclusive object of the present invention to provide systems, assemblies, and methods of reducing head loss in heating devices.

It is an additional optional, non-exclusive object of the present invention to provide heater manifolds or other components with low-restriction chambers.

It is also an optional, non-exclusive object of the present invention to provide a repositionable gate for directing water flow within a low-restriction chamber, both of which may be placed within a heater housing so as to avoid need for external plumbing.

It is, moreover, an optional, non-exclusive object of the present invention to provide a repositionable gate with a poppet valve assembly incorporated therein.

Other objects, features, and advantages of the present invention will be apparent to those skilled in the appropriate art with reference to the remaining text and the drawings of this application.

DETAILED DESCRIPTION

Figure 1:
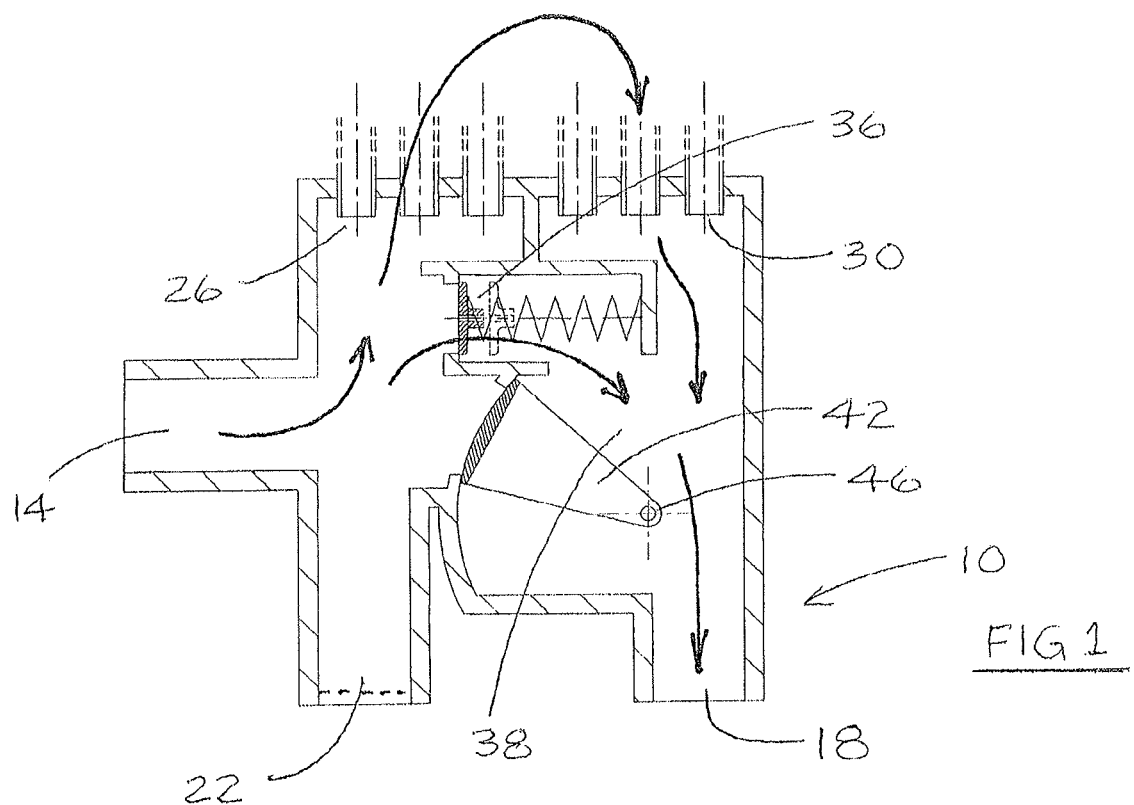
FIG. 1 is a cross-sectional, partially-schematic view of an exemplary manifold including technology of the present invention and with a repositionable gate in a "closed" position.
Figure 2:
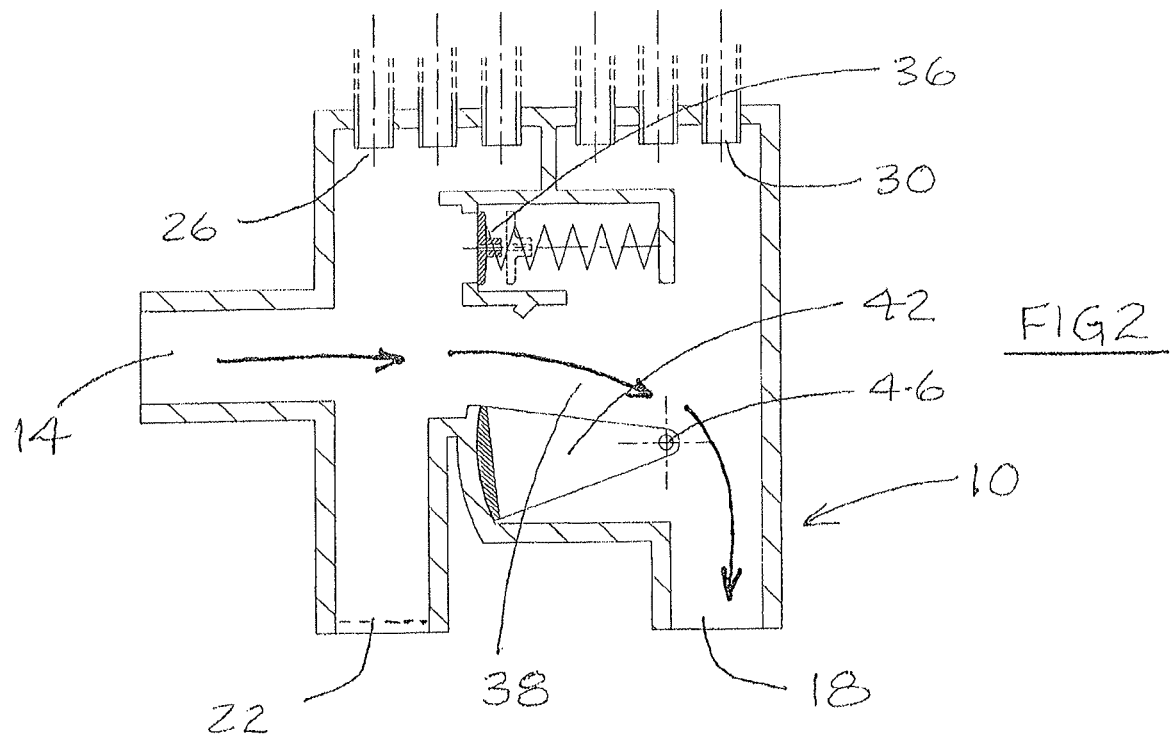
FIG. 2 is a cross-sectional, partially-schematic view of the manifold of FIG. 1 with the repositionable gate in an "open" position.
Figure 5:
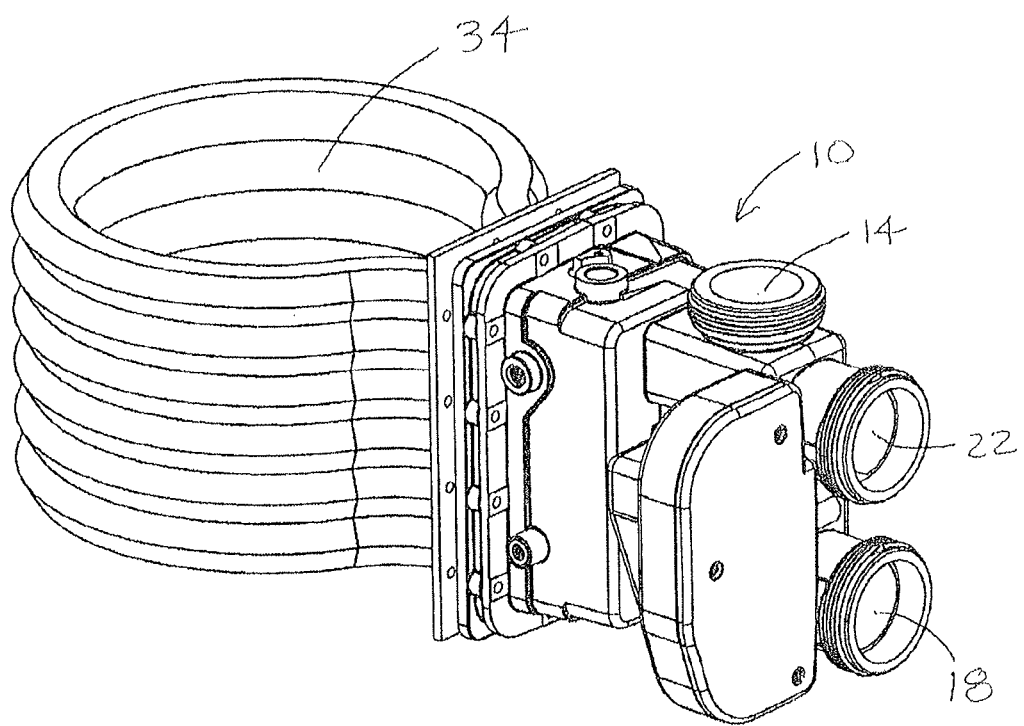
FIG. 5 is a perspective view of the manifold of FIGS. 1-2 to which tubes are attached.

Illustrated in FIGS. 1-2 and 5 is exemplary manifold 10. Manifold 10 may include at least one inlet 14 and at least one outlet 18. Also shown in FIGS. 1-2 and 5 is optional second inlet 22. Depending on how manifold 10 is plumbed in a water circulation system, either of inlets 14 or 22 may be connected so as to receive circulating water. Typically the other of inlets 14 or 22 would be plugged, although conceivably both inlets 14 and 22 could be used simultaneously.

Included in manifold 10 may be plural openings 26 and 30. Openings 26 preferably, although not necessarily, are aligned, as preferably are openings 30. A corresponding set of openings 26 and 30 may function as inlet and outlet of an associated tube 34 of a heat exchanger or similar device. FIG. 5 shows six such tubes 34, although more or fewer tubes 34, or "tubes" of different shape, may be utilized instead. Also included in manifold 10 may be poppet valve assembly 36.

Shown especially in FIG. 2 is low-restriction chamber 38 within manifold 10. Chamber 38 preferably is sized and shaped so as to provide substantial volume through which water may flow. Accordingly, if water is not obstructed as it travels from inlet 14 or 22 through chamber 38 to outlet 18, head loss of the flowing water is anticipated to be minimal— or at least materially less than with current manifold designs.

FIG. 2 illustrates a barrier, in the form of gate 42, in its "open," or second, position. In this position gate 42 does not materially obstruct water flow through chamber 38. Gate 42 advantageously may be in this open position when a heating device connected to manifold 10 is inactive, resulting in a low-resistance water path existing through the chamber 38. Little or no water hence enters tubes 34 when no water heating is occurring, reducing wear of the tubes 34 otherwise caused by the flowing water.

FIG. 1, by contrast, details gate 42 in its "closed," or first, position. In this position gate 42 obstructs substantially all water flow through chamber 38. Water entering manifold 10 through an inlet 14 or 22 hence is directed to openings 26 and into tubes 34 for heating. Heated water returns to manifold 10 through openings 30 and travels to outlet 18 to continue the circulation process. Excess pressure of water entering manifold 10 in this instance may cause poppet valve assembly 36 to open, hence creating a second flow path to outlet 18.

Repositioning of gate 42 may be caused by any appropriate device. Preferably gate 42 is actuated by a solenoid configured to turn axle 46 which is connected to the gate 42. Rotation of axle 46 in turn causes gate 42 to pivot between (at least) its first and second positions. Persons skilled in the art will recognize that gate 42 may move in other manners, or actuated by other devices, instead though.

Figure 3:
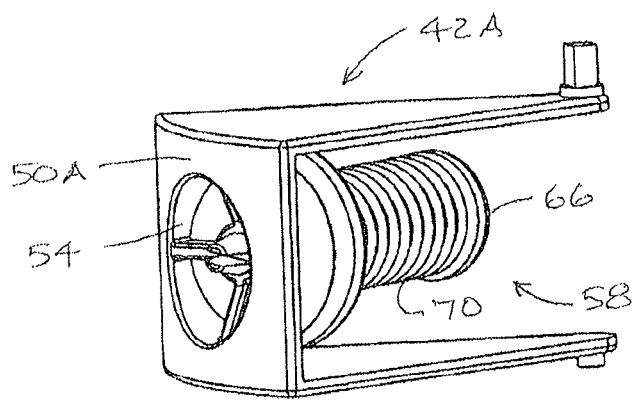
FIG. 3 is perspective view of an alternative gate of the present invention into which is incorporated a poppet valve assembly.
Figure 4:
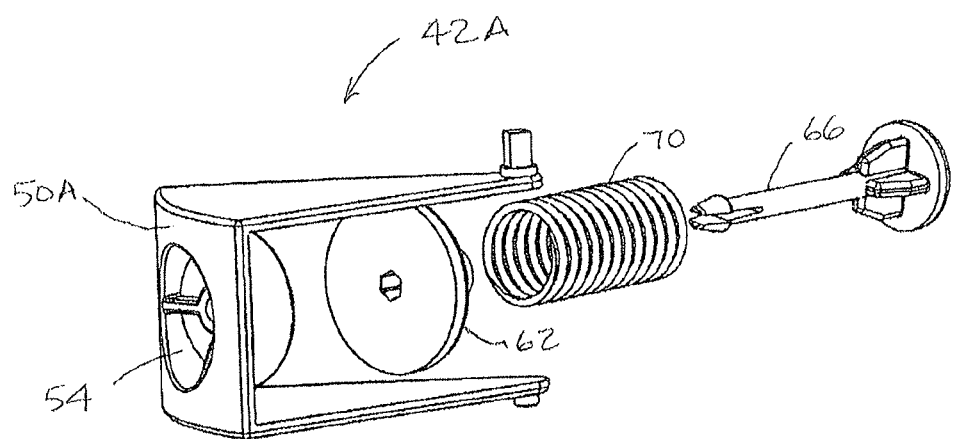
FIG. 4 is a perspective view of the gate of FIG. 3 with the poppet valve assembly exploded.

Gate 42 beneficially may have a solid face 50 sized and shaped to prevent passage of water when in the closed position (i.e. the area of face 50 is approximately the same as a cross-sectional area of at least some portion of chamber 38). FIGS. 3-4 depict an alternate gate 42A in which otherwise-solid face 50A includes an opening 54. Placed behind opening 54 may be poppet valve assembly 58 including disc 62, stem 66, and coil spring 70. Spring 70 biases disc 62 so as normally to close opening 54, thus normally causing face 50A to obstruct flowing fluid it encounters. Should water flow through inlet 14 or 22 exert against face 50A a force exceeding a predetermined amount, however, it will overcome force of spring 70 and push disc 62 away from opening 54. This action produces a bypass path into and through chamber 38 to outlet 18 and serves to regulate flow rate into the heat exchanger.

Figure 6:
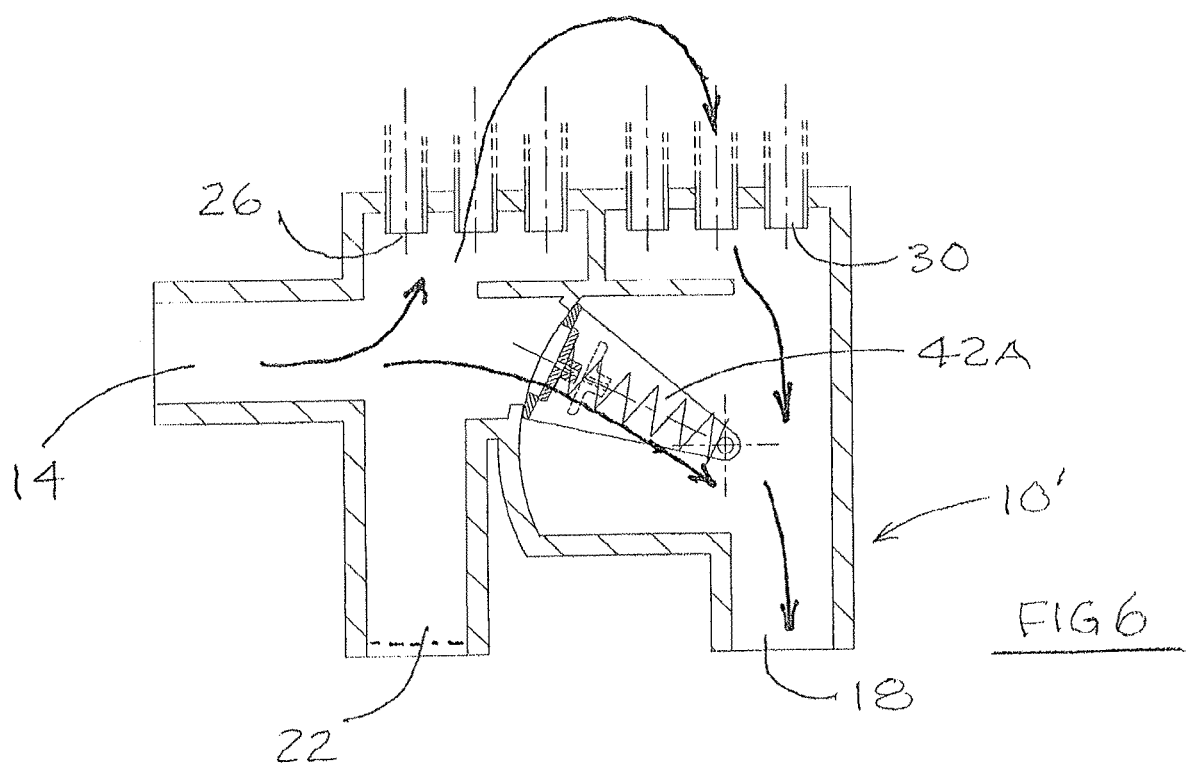
FIG. 6 is a cross-sectional, partially-schematic view of an exemplary manifold including technology of the present invention and with the repositionable gate of FIG. 3 in a "closed" position.
Figure 7:
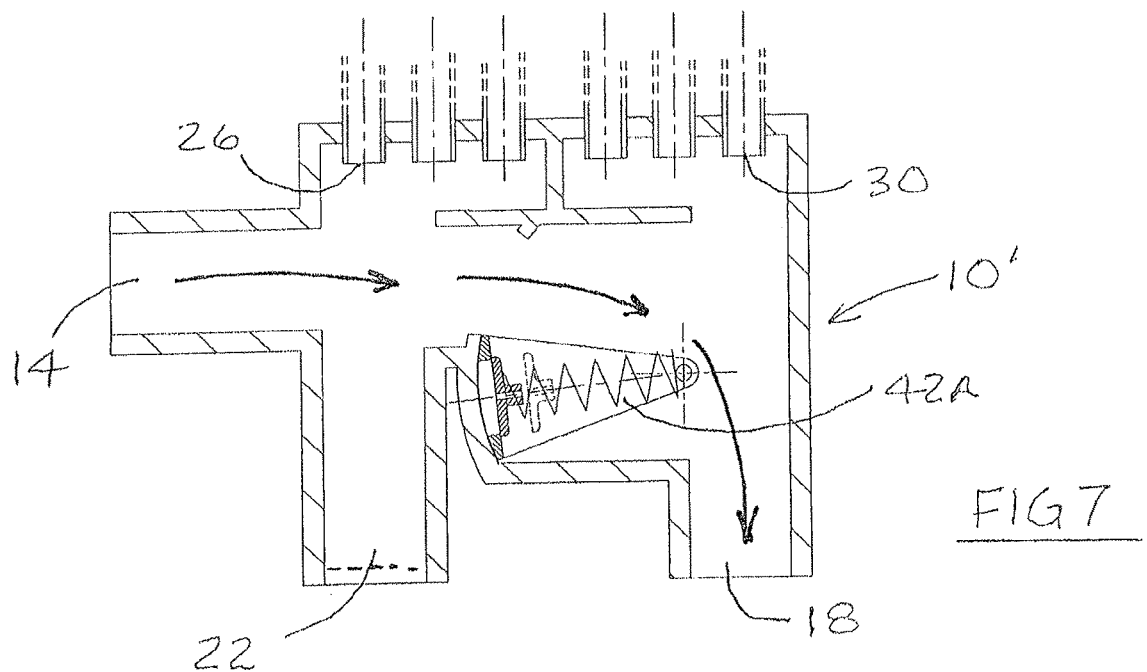
FIG. 7 is a cross-sectional, partially-schematic view of the manifold of FIG. 6 with the repositionable gate of FIG. 3 in an "open" position.

Incorporating poppet valve assembly 58 into gate 42 avoids any need for the separate poppet valve assembly 36 appearing in FIGS. 1-2. Such a modified manifold 10' is depicted in FIGS. 6-7, in which gate 42A is shown in "closed" and "open" positions, respectively. Clear from FIGS. 7-8 is that, because gate 42A already includes poppet valve assembly 58, no separate assembly 38 is needed.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of operating a pool-water circulation system, comprising:
   a. causing pool water to be received by an inlet of a manifold also comprising an outlet, a chamber, a gate positioned at least partially within the chamber, and first openings;
   b. electrically activating or deactivating a heating device by respectively electrically connecting the heating device to, or electrically disconnecting the heating device from, a source of electrical power; and
   c. causing an automatic actuator to position the gate so as to allow the pool water to flow from the inlet to the outlet without significant restriction if the heating device is electrically deactivated or from the inlet, through the first openings, to a heat exchanger for heating when the heating device is electrically activated.

2. A method according to claim 1 in which the heat exchanger comprises tubes having second openings in liquid communication with the first openings.

3. A method according to claim 2 in which the gate has a solid face having an area approximately the same as a cross-sectional area of the chamber.

4. A method according to claim 3 in which, when positioning the gate, the automatic actuator causes movement of an axle attached to the gate.

5. A method of operating a pool-water Circulation system, comprising:
   a. causing pool water to be received by an inlet of a manifold also comprising an outlet, a chamber, a gate (i) positioned at least partially within the chamber and (ii) having a solid face having an area approximately the same as a cross-sectional area of the chamber, and first openings;
   b. electrically activating or deactivating a heating device by respectively electrically connecting the heating device to, or electrically disconnecting the heating device from, a source of electrical power;

c. causing an automatic actuator to position the gate, by causing movement of an axle attached to the gate, so as to allow the pool water to flow from the inlet to the outlet without significant restriction if the heating device is electrically deactivated or from the inlet, through the first openings, to a heat exchanger for heating when the heating device is electrically activated, the heat exchanger comprising tubes having second openings in liquid communication with the first openings; and d. configuring a valve assembly positioned at least partially within the chamber to open, thus allowing pool water to bypass the gate, when a force exerted by the pool water against the valve assembly exceeds a predetermined amount.

6. A method according to claim 5 in which the valve assembly comprises a poppet valve.

7. A method of operating a pool-water circulation system, comprising:
a. causing pool water to be received by an inlet of a manifold also comprising an outlet, a chamber, a gate positioned at least partially within the chamber, and first openings;
b. electrically activating or deactivating a heating device by respectively electrically connecting the heating device to, or electrically disconnecting the heating device from, a source of electrical power; and
c. causing an automatic actuator to position the gate so as to allow a substantially greater volume of the pool water to flow from the inlet, through the first openings, to a heat exchanger for heating when the heating device is electrically activated than when the heating device is electrically deactivated.

8. A method of operating a pool-water circulation system, comprising:
a. causing pool water to be received by an inlet of a manifold also comprising an outlet, a chamber, a gate positioned at least partially within the chamber, and first openings;
b. electrically activating or deactivating a heating device by respectively electrically connecting the heating device to, or electrically disconnecting the heating device from, a source of electrical power; and
c. causing an automatic actuator to position the gate so as (i) to allow the pool water to flow from the inlet to the outlet without significant restriction if the heating device is electrically deactivated or (ii) to allow a substantial volume of the pool water to flow from the inlet, through the first openings, to a heat exchanger for heating when the heating device is electrically activated.

9. A method of operating a pool-water circulation system, comprising:
a. causing pool water to be received by an inlet of a manifold also comprising an outlet, a chamber, a gate positioned at least partially within the chamber, and first openings;
b. electrically activating or deactivating a heating device by respectively electrically connecting the heating device to, or electrically disconnecting the heating device from, a source of electrical power;
c. causing an automatic actuator to position the gate so as to allow a substantially greater volume of the pool water to flow from the inlet, through the first openings, to a heat exchanger for heating when the heating device is electrically activated than when the heating device is electrically deactivated; and
d. configuring a valve assembly positioned at least partially within the chamber to open, thus allowing pool water to bypass the gate, when a force exerted by the pool water against the valve assembly exceeds a predetermined amount.

10. A method of operating a pool-water circulation system, comprising:
a. causing pool water to be received by an inlet of a manifold also comprising an outlet, a chamber, a gate positioned at least partially within the chamber, and first openings;
b. electrically activating or deactivating a heating device by respectively electrically connecting the heating device to, or electrically disconnecting the heating device from, a source of electrical power;
c. causing an automatic actuator to position the gate so as (i) to allow the pool water to flow from the inlet to the outlet without significant restriction if the heating device is electrically deactivated or (ii) to allow a substantial volume of the pool water to flow from the inlet, through the first openings, to a beat exchanger for beating when the heating device is electrically activated; and
d. configuring a valve assembly positioned at least partially within the chamber to open, thus allowing pool water to bypass the gate, when a force exerted by the pool water against the valve assembly exceeds a predetermined amount.

* * * * *